(12) United States Patent
Bellandi (10) Patent No.: US 10,962,390 B2
(45) Date of Patent: Mar. 30, 2021

(54) MODULE FOR A SENSOR BOX FOR INDUSTRIAL AUTOMATION AND RESPECTIVE SENSOR BOX

(71) Applicant: GIMATIC S.r.l., Roncadelle (IT)

(72) Inventor: Giuseppe Bellandi, Roncadelle (IT)

(73) Assignee: GIMATIC S.R.L., Roncadelle (IT)

( * ) Notice: Subject to any disclaimer, the term of this patent is extended or adjusted under 35 U.S.C. 154(b) by 132 days.

(21) Appl. No.: 16/160,020

(22) Filed: Oct. 15, 2018

(65) Prior Publication Data

US 2019/0113371 A1    Apr. 18, 2019

(30) Foreign Application Priority Data

Oct. 16, 2017    (IT) .................. 102017000116305

(51) Int. Cl.
G01D 11/24    (2006.01)
(52) U.S. Cl.
CPC ........... G01D 11/245 (2013.01); G01D 11/24 (2013.01)
(58) Field of Classification Search
None
See application file for complete search history.

(56) References Cited

U.S. PATENT DOCUMENTS

| | | | | |
|---|---|---|---|---|
| 6,278,605 B1* | 8/2001 | Hill | .................. | H02B 1/26 200/307 |
| 2001/0043062 A1* | 11/2001 | Reid | .................. | G01R 21/06 324/117 R |
| 2008/0238713 A1* | 10/2008 | Banhegyesi | .................. | G01R 22/065 340/870.02 |
| 2008/0284614 A1* | 11/2008 | Perez | .................. | G01R 22/065 340/870.02 |
| 2012/0206848 A1* | 8/2012 | Gillespie | .................. | H02H 5/041 361/104 |
| 2013/0314245 A1* | 11/2013 | Sykes | .................. | G01D 4/002 340/870.02 |
| 2015/0241480 A1* | 8/2015 | Harding | .................. | G01R 21/00 324/156 |
| 2015/0316944 A1* | 11/2015 | Thellend | .................. | G05F 1/66 700/292 |

FOREIGN PATENT DOCUMENTS

| | | |
|---|---|---|
| EP | 0726631 A2 | 8/1996 |
| EP | 2635877 B1 | 12/2016 |
| GB | 2503479 A | 1/2014 |

* cited by examiner

*Primary Examiner* — Paul M. West
*Assistant Examiner* — Mark A Shabman
(74) *Attorney, Agent, or Firm* — Volpe Koenig (57) ABSTRACT

A module for a sensor box for automation devices and a respective sensor box includes a containing body, an electronic circuit housed inside the containing body and is designed to define a so-called master module, or a so-called slave module. The module also includes one or more main electric contacts emerging from a first side of the containing body, at least one passage for a respective connecting cable for the connection to an outside device and one or more openings, each arranged on a second side of the containing body which is opposite to said first side. The main electric contacts and the openings are arranged in corresponding positions on the first side and on the second side, so that all the main electric contacts emerge from the first side in a position corresponding to that of at least one opening on the second side.

14 Claims, 4 Drawing Sheets

FIG. 1

PRIOR ART

MODULE FOR A SENSOR BOX FOR INDUSTRIAL AUTOMATION AND RESPECTIVE SENSOR BOX

CROSS REFERENCE TO RELATED APPLICATIONS

This application claims priority to Italian Patent Application No. 10 2017 000116305, filed Oct. 16, 2018, the entire contents of which are incorporated by reference as if fully set forth.

FIELD OF THE INVENTION

The present invention relates to the field of industrial automation and concerns in particular a module for a sensor box for industrial automation and a sensor box comprising a plurality of modules of the above said type.

BACKGROUND

In the field of industrial automation, the use of automation devices or industrial robots, such as grippers or robotic arms, for the handling and manipulation of objects during an industrial process, is well known.

These devices are usually equipped with sensors to check the correct operation of the various components, or tools, of the automation device, so as to ensure the correct state of the device or the correct positioning of the object it supports, before starting a subsequent step of the machining or handling process.

In order to wire the sensors on board the devices of the above mentioned type, at least one box for connecting sensors, also defined sensor box, can be installed, which allows a plurality of sensors, even different from one another, to be connected in series.

Figure 1:
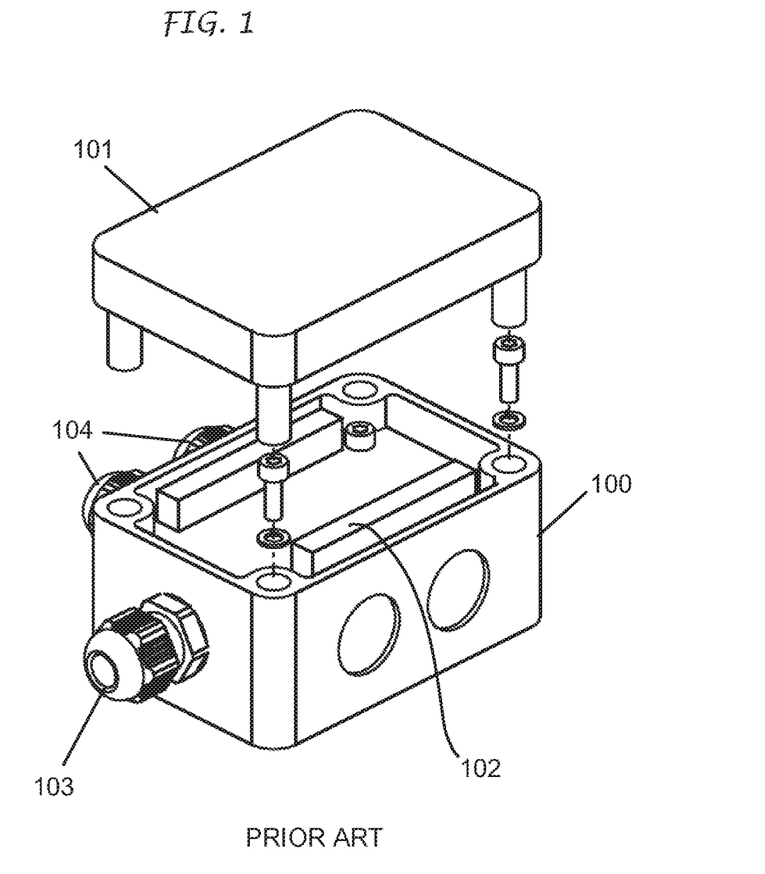
FIG. 1 is a view of a sensor box according to the state of the art.

The sensor boxes currently available on the market, as shown in FIG. 1, have a box-like body 100 closed by a cover 101 inside which a series of contacts 102 are arranged in order to deliver the electric power supply to the sensors, receive from the sensors themselves an indication of their state and transmit this state to a control device, such as a PLC. For this purpose, the sensor box is connected to the control device via a special cable and to the sensors installed in the automation device via one or more cables, usually multipolar cables.

For the connection of these cables to the circuitry of the sensor box, the sensor box itself comprises respective passages 103, 104 arranged in fixed positions, in particular in predefined positions with respect to the fastening surface of the sensor box, which is responsible for combining the latter with the structure of the automation device.

In particular, there is a first passage or output 103 for the connecting cable towards the control device, and a second passage or output 104 for each of the cables intended for the sensors.

In addition, it must be said that the aforementioned cables are large, not very flexible and therefore difficult to be wired.

Additional elements, such as fastening brackets, are also required to fasten the sensor box to the structure of the automation device.

Sensor boxes currently available are designed for connecting a maximum number of sensors, for example up to 2, up to 4, up to 6, up to 8, up to 12, etc., so that during the step of setting up the automation device, a sensor box must be selected having a number of contacts 102 consistent with the number of sensors to be mounted. However, since these are standard sizes, not all the contacts available are always used. In this case, inconveniently, the bulk is greater than necessary.

The above is significant if we consider that, due to their very shape, the sensor boxes are rather cumbersome, especially when compared to the small spaces available in automation devices of the above said type.

In fact, the box-like body is sized to house all the contacts, some of which, or all in case all the available outputs are in use, must then be joined by jumpers to form the series connection of the sensors depending on the required design.

In addition, since there are different sizes depending on the maximum number of sensors that can be connected, sensor boxes of various sizes have to be kept in stock in order to meet all needs.

There are also devices comprising several modules arranged in series or in parallel to measure and/or monitor consumption, in particular power consumption.

Specifically, document US2015/0241480 A1 concerns a power meter designed to receive rear and side expansion modules. For this purpose, the meter is provided with a rear opening and a side opening to receive a connector of an expansion module.

European Patent EP 2 635 877 B1 concerns a modular measuring system, comprising at least one slave module to measure a parameter, e.g. the consumption of power, gas, water, etc., and a master module electronically communicating with the slave module, for example wirelessly or via a communication module, wherein each slave module can comprise a meter for measuring the respective parameter from a remote load, while the master module is arranged to poll the slave modules and can comprise an electronic processor, a memory, a data logger and a user interface to display information received from a slave module selected through keyboard.

Document US 2008/0284614 A1 relates to a modular system for monitoring the power of one or more electric power lines, comprising a central unit including a meter and several optional modules, each combined with the central unit in parallel with the others.

Document GB 2503479 relates to a telemetry device to be used in a consumption unit, having at least one input to receive electric power data, e.g. data from a meter related to local electric power consumption or generation, and at least one output channel arranged to transmit electric power data, e.g. via wireless communication, to a remote server.

European Patent Application EP 0 726 631 A2, on the other hand, provides a junction box to be arranged on a floor to hold therein electrical and telephone equipment, EDP equipment or the like, which comprises a box-like body having openings for cables to pass therethrough.

SUMMARY

An object of the present invention is to provide a sensor box for automation devices able to overcome the limits of known solutions by allowing the bulk to be minimized.

Another object is to propose a sensor box, whose dimensions are optimized according to the exact number of sensors installed in the automation device.

A further object is to provide a sensor box that is structurally simple and provided with installation versatility.

Still another object is to provide a sensor box that allows the minimization of the number of components to be kept in stock, while allowing the different construction needs to be met.

In a first aspect, therefore, the present invention concerns a module for a sensor box, wherein the module, which is prearranged to be connected to an outside device, is equipped with an electronic circuit that can be designed to define a so-called master module, or a so-called slave module, to define a sensor box with master and slave modules identical to each other except for the electronic circuit. In other words, the same module can be a master module or a slave module by simply designing the electronic circuit appropriately. This way, a master module can be structurally equal to a slave module in terms of shape, size and connections. The only difference is the different design of the electronic circuit inside module itself. In addition, this feature is particularly advantageous because it allows a master module or a slave module to be equally obtained starting from a single starting component, thus simplifying the warehouse, which will not have to provide different components to obtain modules of different types.

In particular, the above said module comprises an electronic circuit housed inside a containing body; one or more main electric contacts protruding from one side of the housing; at least one passage for a connecting cable for the connection to an outside device; and one or more openings, wherein each opening of the above said one or more openings is arranged on a second side of the housing opposite to the above said first side, and is sized and positioned on the second side so as to be in a position corresponding to that of at least one of the above said one or more main electric contacts, so that each of the one or more main electric contacts is in a position corresponding to one opening of the one or more openings. As an alternative, the main electric contacts are accessible from the first side of the containing body and the openings of the second side of the containing body are replaced by projections.

Advantageously, therefore, the above said module may comprise a single main electric contact and a single opening, which are arranged in corresponding positions but on opposite sides of the containing body, or a plurality of main electric contacts and one or more openings, each sized and arranged on the respective side so as to result next to at least two main electric contacts, or else a plurality of main electric contacts and a plurality of openings, whose number is equal to the number of the above said main electric contacts and each arranged on the second side in a position corresponding to the position of a main electric contact on the first side.

The electronic circuit defining the master module is designed to be connected to an electric power supply and to generate output signals towards an outside control device, such as a PLC, while the circuit defining the slave module is designed to be connected to a sensor.

In a preferred solution, some main electric contacts, preferably two, are intended to transfer the electric power supply, while others, preferably two, are intended to transmit signals.

Advantageously the main electric contacts are combined with the electronic circuit so as to be movable between a forward and a backward position. The main electric contacts can usually be kept in the forward position by suitably prearranged elastic means and can be pushed towards the backward position, thereby causing the elastic means to be compressed.

Preferably the electronic circuit is equipped with selectors that are accessible from the outside of the containing body in order to allow the module's operation to be set.

Preferably, the aforesaid containing body of the aforesaid module is made of a plastic material, more preferably a semi-transparent one.

Preferably the above said module has a substantially square section, having sides of about 40 mm and thickness of about 10 mm.

In another aspect, the invention refers to a sensor box, comprising at least two modules of the above said type.

In detail, the sensor box comprises at least one master module, for the connection to power supplying means and for the signal transmission, and at least one slave module for the connection to a sensor, the former and the latter being connected in series one another starting from a first master module up to a last slave module. The sensor box thus obtained comprises master and slave modules that are structurally identical to each other. Thanks to this particular design, sensor boxes of any type and number of modules can be composed, as required.

Advantageously, the main electric contacts of a module cooperate with the openings of a subsequent module. Specifically, the main electric contacts, which emerge from the first side of the containing body, are either inserted into the openings and cooperate with respective portions of the electronic circuit of the adjacent module, the portions acting when needed as electric connectors, or else the main electric contacts, accessible from the first side of the containing body, cooperate with respective projections combined with the second side of the main body of the adjacent module, the projections acting when needed as electric connectors. The modules can thus be connected to each other starting from a first master module, followed by one or more slave modules, if necessary interspaced with other master modules, up to a last slave module, depending on the number of sensors to be connected and on the need of forming groups of slaves, each belonging to a respective master. In fact, the feature of having a master module structurally identical to the slave module, allows more than one master module to be inserted in the same sensor box, thereby allowing, advantageously, a variety of sensors to be connected to the same sensor box even if they have to be grouped and combined with different master modules, according to design requirements.

Advantageously, this sensor box has a modular structure comprising modules structurally identical to each other and able to be modified even after having being installed simply by adding, removing or moving master modules and/or slave modules as needed, thereby ensuring great flexibility of use.

Preferably, a part of the main electric contacts of a master module which are intended to transfer the electric power supply, are electrically connected to the corresponding main electric contacts of a downstream slave module, and the main electric contacts of a slave module which are intended to transfer the electric power supply, are electrically connected to the corresponding main electric contacts of a master or slave module upstream and possibly to the corresponding main electric contacts of a downstream slave module, so as to define a power line of the sensor box.

The remaining main electric contacts of a master module which are intended to transmit signals, are electrically connected to the corresponding main electric contacts of a downstream slave module, and the main electric contacts of a slave module which are intended to transmit signals, are electrically connected to the corresponding main electric contacts of an upstream master or slave module and possibly to the corresponding main electric contacts of a downstream slave module, so as to define connections to form a logical series of contacts for the signal transmission. In fact, once the main electric contacts intended for the signal transmission are connected to those of other adjacent modules, they define an inner connection BUS, in which the aim of each master module is to logically cluster a group of one or more slave modules and, at the same time, to separate it from other possible groups of slave modules belonging to other master modules.

Preferably, each slave module of a group of modules transmits output signals to the upstream slave or master module, up to the master module combined with the given group of modules, the output signals being updated based both on the state of the sensor connected to the slave module and the state of the output signals of the slave module connected downstream. This creates a backward and cascaded update of the signals starting from the last slave module of the module group up to the master module. Therefore, the single slave module communicates only with the sensor combined therewith and with the modules adjacent thereto, but cannot set up direct communication with the PLC. Actually, only the master modules are connected and therefore can communicate with the PLC, sending it output signals indicating the state of the sensors connected to them through their respective slave modules.

It is however possible to have master and slave modules whose main electric contacts and electronic circuit are designed to define a communication BUS, preferably a digital-type BUS.

Preferably, the sensor box can be equipped with a closing and bracketing unit to be combined with the first master module and the last slave module of the sensor box.

In a particularly preferred solution, the modules have substantially square section, so that they can be mounted in two different positions, turned by 90° one with respect to the other, in relation to the respective closing and bracketing unit.

BRIEF DESCRIPTION OF THE FIGURES

Further characteristics and advantages of the invention will be more evident by the review of the following specification of a preferred, but not exclusive, embodiment, which is depicted for illustration purposes only and without limitation, with the aid of the attached drawings, in which.

DETAILED DESCRIPTION OF THE PREFERRED EMBODIMENTS

Figure 2A:
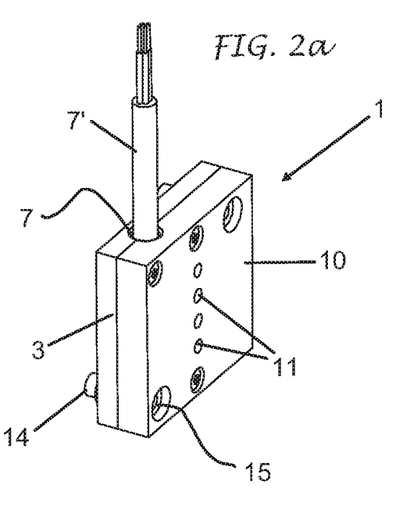
FIGS. 2a and 2b show respective perspective views taken from opposite directions of a module according to the present invention, for a sensor box.
Figure 2B:
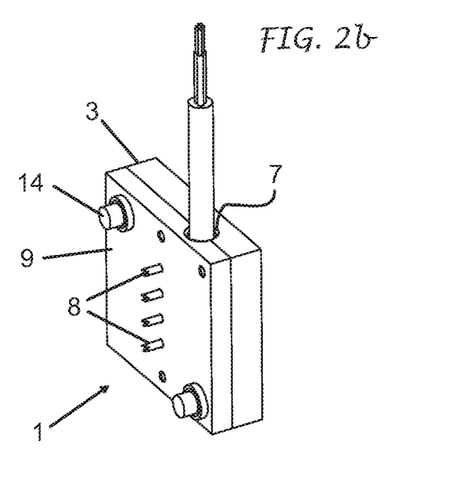
Figure 3:
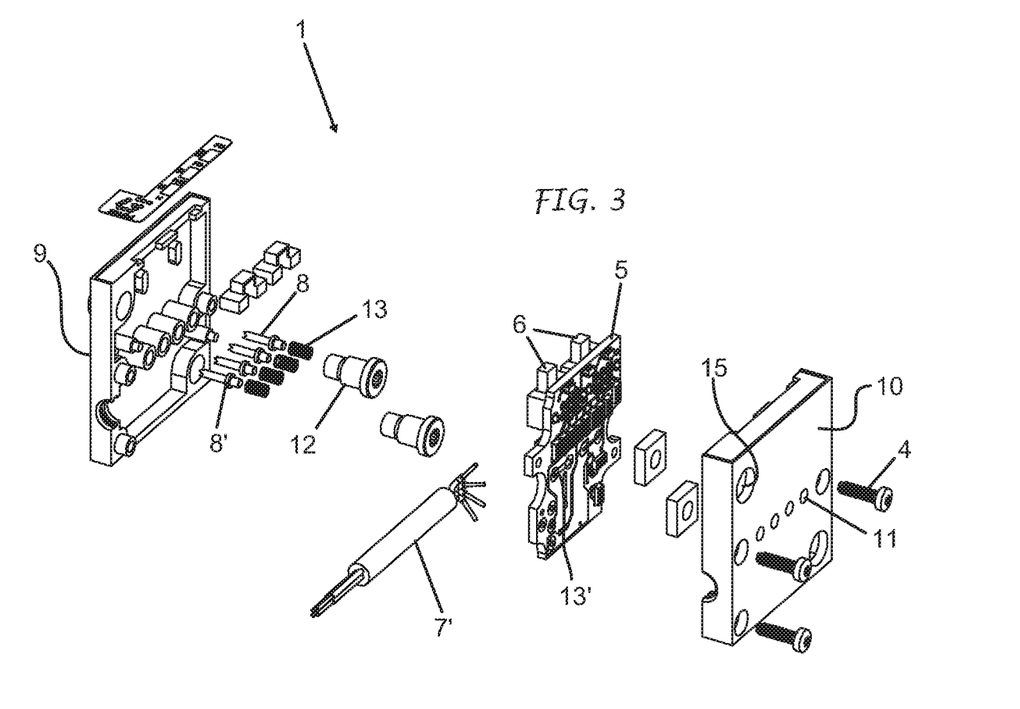
FIG. 3 shows an exploded view of the module of FIGS. 2a and 2b.
Figure 4:
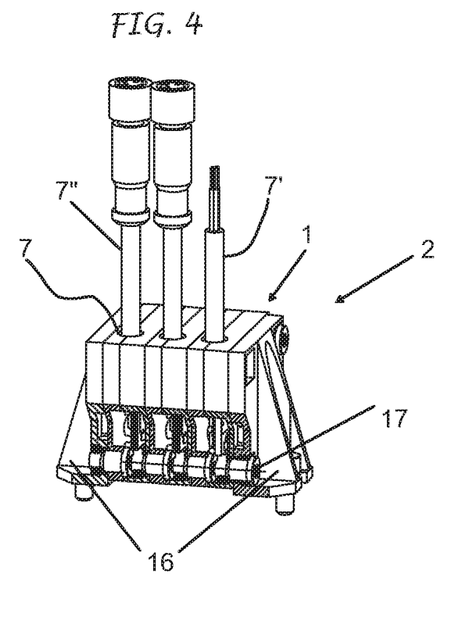
FIG. 4 shows a perspective view of a sensor box comprising a plurality of modules, according to the present invention.
Figure 5:
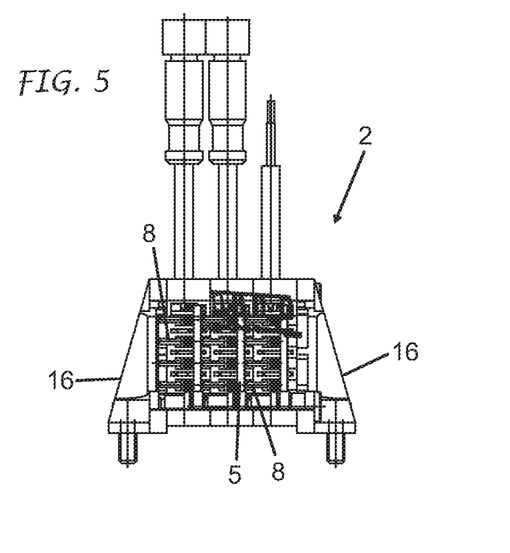
FIG. 5 shows a longitudinal-sectional front view of the sensor box shown in FIG. 4.
Figure 6:
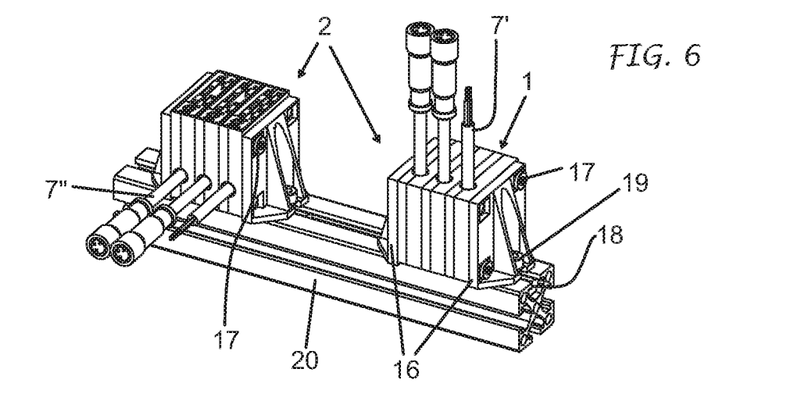
FIG. 6 shows two different modes of installing the sensor box according to the present invention.
Figure 7A:
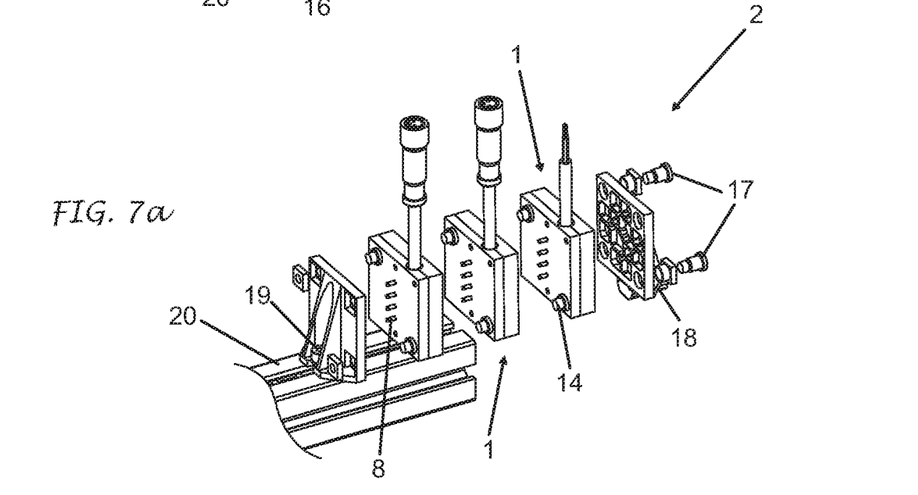
FIGS. 7a and 7b show exploded views, taken from opposite directions, of one of the sensor boxes of FIG. 6.
Figure 7B:
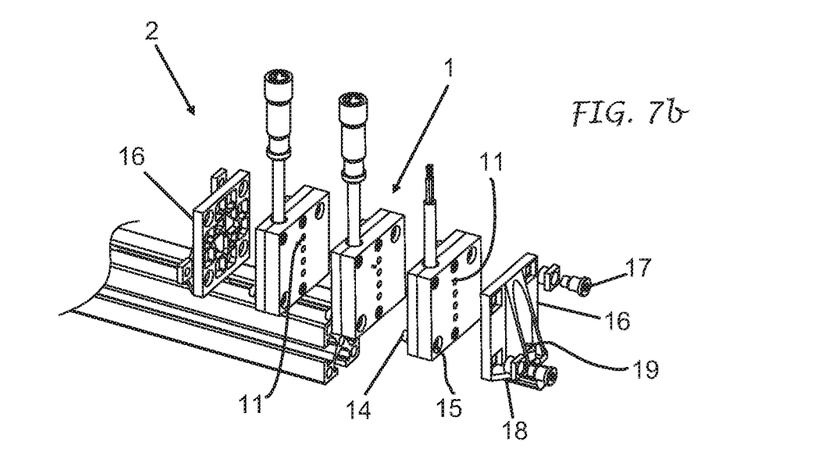

FIGS. 2a, 2b and 3 show a module 1 according to the present invention for a sensor box 2.

FIGS. 4-8 show a sensor box 2 according to the invention, comprising a plurality of modules 1, with different designs or installation modes.

The sensor box 2 is prearranged to be installed on board the automation devices, such as manipulators or robotic arms, having one or more tools, each able to be combined with a relative sensor to control the state of the tool itself.

The module 1 comprises a containing body 3, which may consist of two half-bodies joined together by fastening means 4 and inside which an electronic circuit 5 is housed. The electronic circuit 5 is equipped with selectors 6 emerging from the containing body when assembled.

The module 1 is prearranged to be connected to an outside device. In particular, the module 1 has a passage 7 for a connecting cable 7' or 7" for the connection to the outside device.

The module 1 also comprises one or more main electric contacts 8 accessible, preferably emerging, from a first side 9 of the containing body 3.

One or more openings 11 are obtained in a second side 10 of the containing body 3 opposite to the first side 9, and are arranged on the second side 10 in positions corresponding to those of the main electric contacts on the first side.

In a preferred solution the module comprises at least two, preferably four, main electric contacts 8 and at least one opening 11 sized and positioned on the second side so as to be in a position corresponding to the position of at least two of said at least two main electric contacts on the first side. If the module comprises a single opening, the latter is sized and obtained in the second side in a position corresponding to the position of all the main electric contacts at the second side. Alternatively, multiple openings sized and arranged on the second side can be provided at the position of said at least two main electric contacts in the first side. In other words, there could be a plurality of openings, each sized and obtained on the second side, in a position corresponding to the position of at least one main electric contact in the first side. Each main electric contact must emerge, or be accessible, from the first side in a position corresponding to the position of an opening on the opposite side, either individually or in combination with other main electric contacts.

In a particularly preferred solution, the number of openings 11 is at least equal to the number of main electric contacts 8 and each main contact emerges from the first side in a position corresponding to the position of a respective opening in the second side.

The main electric contacts 8 are combined with the electronic circuit 5 of the module 1 through fastening means 12 interacting with elastic means 13 so that each main electric contact is movable along its longitudinal direction between a forward position and a backward position.

Therefore, the portion of the main electric contact emerging from the first side 9 of the containing body 3, when the main electric contact is in the forward position, can be partially pushed into the containing body itself, as a result of a pressure applied from the outside to the main electric contact thereby causing the elastic means to be compressed. In addition, each main electric contact 8 is provided with countercheck means 8' on which act the elastic means 13 and that interact with the first side 9, in order to hold a portion of the electric contact itself inside the main body of the module.

One or more projections 14 are obtained at the first side 9, while one or more recesses 15 are obtained at the second side, or vice versa, where the projections on one side and the recesses on the other side are obtained in reciprocally corresponding positions.

In addition, the number of projections is equivalent to the number of recesses. Basically, the shapes of the projections 14 are complementary to the shapes of the recesses 15.

The electronic circuit 5 of the module 1 can be designed to define either a so-called master module or a so-called slave module. The master module is intended to be connected to a control unit of the automation device via the cable 7', while the slave module is intended for the connection of a single sensor via the cable 7".

The sensor box 2 according to the invention is of modular type and comprises at least one master module and at least one slave module, for connecting at least one sensor.

The master module is designed to power at least part of the sensor box and to generate outputs indicating the state of the at least one sensor. Each slave module is intended to receive signals indicating the state of the sensor combined therewith.

Master and slave modules can be easily connected in series one another in cascade, simply by inserting the main electric contact, or the main electric contacts 8, if more than one, of a module in the opening 11, or in the openings, if more than one, of a following master or slave module. In detail, depending on the shape of the module, all the main electric contacts can be inserted in a single opening, or they can be inserted in several openings, individually or at least in pairs, or else, and preferably, each main electric contact 8 can be inserted in a respective opening 11, as shown in the figures.

In order to stabilize the structure of the sensor box 2, the projections 14 of a module cooperate with the recesses 15 of the next module.

The main electric contacts that can be moved along their longitudinal direction guarantee, when required, an optimal coupling of the main electric contacts with an adjacent module; in fact, the elastic means 13 have the function of keeping the main electric contacts always in contact with the respective portions 13' of the electronic circuit 5 of the adjacent module, the portions acting, if necessary, as electric connectors.

Part of the main electric contacts of each module are intended to transfer the electric power supply to the following modules, while the other part are intended to form a logical series of contacts.

Once the modules are connected together, the main electric contacts define a sort of inner connection BUS. The cascaded connection scheme provides a first master module followed by one or more slave modules, if necessary interspaced with other master modules, which have the purpose of separating and logically clustering together groups of slave modules. In fact, the master module supplies/transfers power to the downstream modules and ends the serial connection of upstream modules, if any.

In particular, starting from a given master module, a first main electric contact of the given master module, together with the respective first main electric contact of each of the slave modules connected downstream of the given master module, define a first communication line of the logical series of the normally open contacts of the slave modules connected downstream of the given master module.

Similarly, starting from the given master module, a second main electric contact of the given master module, together with the respective second main electric contact of each of the slave modules connected downstream of the given master module, define a second communication line of the logical series of the normally closed contacts of the slave modules connected downstream of the given master module.

Specifically, the communication lines simply transmit information about the state (open or closed) of a series of electric contacts. As a result, the state of the single sensors or in any case of the single slave modules combined with each master module is not known by the latter that instead only knows the logical result of their series connection.

Therefore, the first and second communication lines define a communication channel for transferring information that is similar to a BUS, but different in that the transferred information does not have digital encoding.

In an alternative embodiment, the electronic circuit and the main electric contacts of the master and slave modules are designed to define a real communication BUS, preferably a digital BUS.

The logical series of both connections is made available to the user by the given master module via two separate outputs simultaneously updated.

Each slave module is also equipped with displaying means to show the operating state of the respective sensor, in order to highlight any malfunctions.

Figure 8:
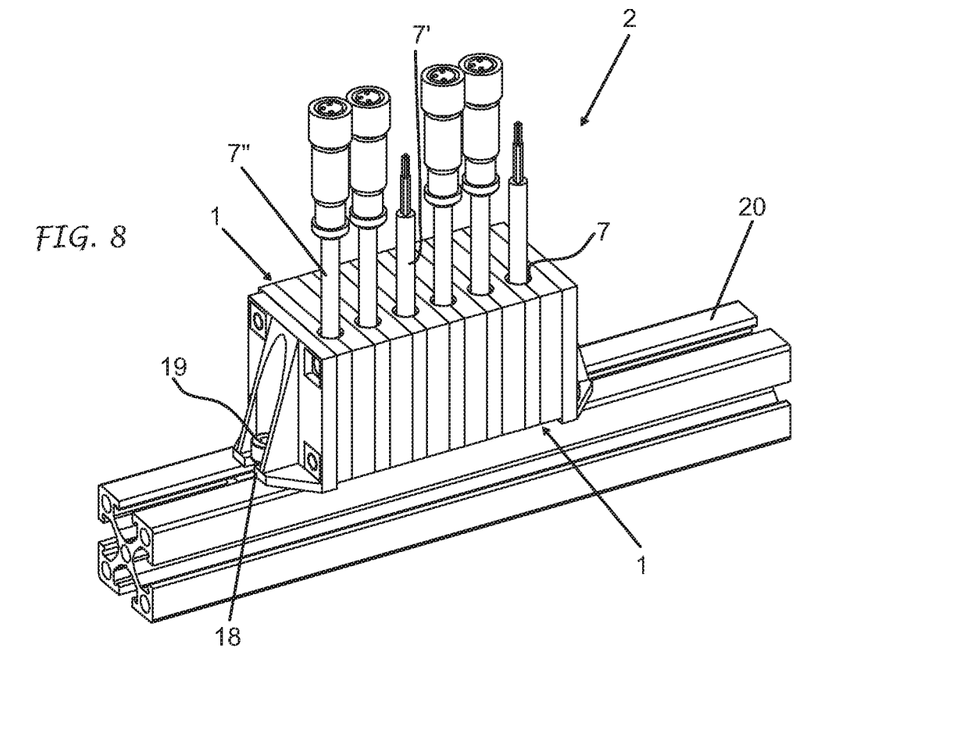
FIG. 8 shows a different design of the sensor box according to the present invention.

Therefore, the sensor box 2 can be designed based on the number of sensors of the automation device and/or the need to create different groups of sensors, simply by prearranging and connecting a master module and the required number of slave modules to one another, the latter in series one another or interspaced with additional master modules as required, as shown in FIG. 8.

The selectors 6 of the electronic circuit, in a slave type module allow the type of connected sensor (PNP, NPN or 2 wires) to be configured and the sensor signal to be managed either in direct logical or in reverse logic, in which a normally open sensor is managed by the module as if it were a normally closed sensor. On the other hand, in the master module, the selectors 6 allow the outputs (PNP or NPN) to be designed and components, such as PULL UP or PULL DOWN integrated resistors which simplify the use of the device by the user, to be inserted.

Since the operating logical of the single slave module can be reversed, it is possible to create complex connection logics. Moreover, the insertion of master modules as intermediate modules allows the connections of the slave modules to be clustered at will, and the two outputs related to the normally open modules and the normally closed modules to be obtained as a series of the only sub-group which the master module refers to. This possibility of use makes the sensor box according to this invention particularly versatile and multifunctional.

In addition, the new sensor box has a very wide range of power supply from 12V to 24V, thereby allowing it to be used in most industrial plants.

Preferably, the sensor box 2 also comprises a closing and bracketing unit 16, which comprises two end elements to be respectively combined with the first module and the last module of the module series. The end element of the closing and bracketing unit 16 combined with the last slave module of the series ends the series connection of all the modules constituting the sensor box. Alternatively, closing and bracketing elements can be directly obtained in one piece in both the first master module and the last slave module of the series. An independent closing and bracketing unit 16 is particularly advantageous from a production and logistic point of view, as it allows the production of sensor boxes of any design from basic components of only three types, namely master module, slave module and closing and bracketing unit.

At least one locking element 17, which interacts with, i.e. engages, openings obtained in both the projections 14 and the recesses 15, can be used to ensure the correct closure of the sensor box.

More specifically, the locking elements 17 are in the form of screws used both to rigidly constrain together two consecutive modules, and to connect the first and last modules of the sensor box to the closing and bracketing unit.

Preferably, the containing body 3 of the module 1 has substantially square section. This allows the modules of a sensor box to be mounted in a first direction with respect to the respective closing and bracketing units, or in a direction turned by 90° with respect to the first direction, thereby allowing the sensor box defined by them to be mounted with the modules in standard alignment position, or turned by 90°, as shown in the example in FIG. 6. This ability allows the passage 7 and the respective connecting cables 7', or 7" on board the automation device to be oriented in a different way, thereby facilitating the installation according to the available space conditions.

Advantageously, the section of the closing and bracketing unit 16 can also have shape and size similar to that of the module 1.

Finally, the closing and bracketing unit 16 is equipped with clamping elements 18 which are intended to be inserted and fastened by special fastening means 19 in standard section bars 20 constituting the supporting structure of the automation device. This design makes it possible to directly lock the sensor box without the need for additional fastening brackets.

Thanks to this fastening method and to the reduced dimensions, the sensor box can also be fastened directly to the edges of the automation device, which usually are the points most accessible by the operator in the common conditions of use, without exceeding the transversal dimension limits of the device itself.

As the modular structure of the new sensor box is composed and sized exactly for the number of sensors in the application, it allows the user to purchase only the components strictly necessary for the application.

In addition, if more than one sensor is added to the automation device, the respective slave and possibly master modules can be added, to redesign the sensor box according to the new needs.

Moreover, the containing body 3 of the module 1 is advantageously made of a plastic material, preferably semi-transparent, and is optimized in terms of mass and size. In fact, each module 1 can have sides of about 40 mm and thickness of about 10 mm, so that sensor boxes can be made having overall dimensions less than half of those currently available on the market, with the same number of connectable sensors.

What is claimed is:

1. A module (1), for a sensor box for automation devices, the module comprising a containing body (3), an electronic circuit (5) housed inside said containing body, at least one main electric contact (8) emerging from a first side (9) of said containing body, wherein said containing body is equipped with at least one passage (7) leading to an interior of the containing body (3) for a respective connecting cable that connects the electronic circuit (5) to an external device, and with at least one opening (11), wherein said at least one opening is arranged on a second side (10) of said containing body (3) which is opposite to said first side (9), wherein said at least one main electric contact and said at least one opening are arranged in corresponding positions on said first side and said second side, respectively, so that the at least one main electric contact emerges from the first side in a position corresponding to a position of the at least one opening of said at least one opening on the second side, and wherein said electronic circuit is configured as a master module or a slave module of a sensor box with master and slave modules having identical containing bodies.

2. The module (1) according to claim 1, wherein said at least one opening (11) is arranged on the second side in a position corresponding to the position of a respective main electric contact (8) of said at least one main electric contact on said first side; or wherein said at least one opening is arranged and sized to be in a position corresponding to a position of at least two main electric contacts on said first side.

3. The module (1) according to claim 1, wherein said electronic circuit (5) defining the master module is configured to be connected to an electric power supply and to generate output signals, and wherein said electronic circuit (5) configured as a slave module is configured to be connected to a sensor.

4. The module (1) according to claim 3, wherein said at least one main electric contact (8) is a plurality of main electric contacts (8) configured to transfer the electric power supply and to transmit signals, wherein said electronic circuit (5) has a plurality of portions (13') whose number is equal to a number of said main electric contacts (8), the portions (13') being arranged on the electronic circuit in a corresponding position, but on the opposite side, with respect to said main electric contacts (8), and wherein said main electric contacts are four, two of which are intended to transfer the electric power supply and the other two to transmit signals.

5. The module (1) according to claim 1, wherein said at least one main electric contact (8) is combined with said electronic circuit (5) by fastening means (12) interacting with elastic means (13) in order to keep the respective main electric contact in a forward position, and wherein each main electric contact is movable along a longitudinal direction thereof so that a portion of the main electric contact emerging from said first side (9) of said containing body (3), when the main electric contact is in the forward position, can be at least partially pushed into said containing body.

6. The module (1) according to claim 1, wherein said electronic circuit (5) is provided with selectors (6), configured to set the module operations, and are accessible from an outside of said containing body.

7. The module (1) according to claim 1, wherein said first side (9) has at least one projection (14), wherein said second side (10) has at least one recess (15) having a number equal to a number of said at least one projection (14), or vice versa, and wherein said at least one projection is located on one side in positions corresponding to positions of said at least one recess (15) on an opposite side thereof, said at least one projection (14) having a shape and size complementary to a shape and size of said at least one projection (15).

8. The module (1) according to claim 1, wherein said containing body (3) has a substantially square section, said module has sides of about 40 mm in length and thickness of about 10 mm.

9. A sensor box (2) for connecting at least one control sensor of an automation device, the sensor box (2) comprising at least two modules according to claim 1, wherein one of said at least two modules is a master module to connect the sensor box to supplying means and to transmit signals, wherein the other of said at least two modules is a slave module to connect to a respective control sensor of the automation device, and wherein said at least two modules are connected in series to one another starting from a first master module up to a last slave module, the at least one main electric contact (8) which emerges from the first side (9) of the containing body (3) of a given module cooperating with the at least one opening (11) of the second side (10) of the containing body of a module following said given module and wherein all of the modules are structurally identical to one another.

10. The sensor box (2) according to claim 9, comprising a master module and at least one slave module connected in series to said master module, or a first and at least one second master module and at least two slave modules, wherein said at least two slave modules are connected downstream of said first master module and interspaced from one another by at least one second master module.

11. The sensor box (2) according to claim 10, wherein the main electric contacts of each master module and slave modules connected thereto are connected in series one another so that, starting from each master module, two main electric contacts of the master module, together with the respective main electric contacts of the slave modules downstream, define a power line of the sensor box and the remaining main electric contacts of the master module, together with the respective main electric contacts of the slave modules downstream, define respective connections for the signal transmission.

12. The sensor box (2) according to claim 10, comprising at least one closing and bracketing unit (16), having two end elements removably combined with a first master module and, respectively, a last slave module of the sensor box.

13. The sensor box (2) according to claim 12, wherein the modules have a substantially square section and wherein the modules can be mounted in a first position, or in a second position turned by 90° from the first position, in relation to the respective closing and bracketing unit.

14. The sensor box (2) according to claim 12, wherein the closing and bracketing unit (16) is provided with bracketing elements (18) to be inserted and fastened, by respective fastening means (19), in supporting elements (20) of the automation device.

* * * * *